US010901395B2

(12) United States Patent
Ozeki (10) Patent No.: US 10,901,395 B2
(45) Date of Patent: Jan. 26, 2021

(54) NUMERICAL CONTROLLER (71) Applicant: Fanuc Corporation, Yamanashi (JP)

(72) Inventor: Shinichi Ozeki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/558,524

(22) Filed: Sep. 3, 2019

(65) Prior Publication Data
US 2020/0081415 A1 Mar. 12, 2020

(30) Foreign Application Priority Data
Sep. 7, 2018 (JP) .................................. 2018-168074

(51) Int. Cl.
G05B 19/4099 (2006.01)
(52) U.S. Cl.
CPC ............. G05B 19/4099 (2013.01); G05B 2219/49023 (2013.01)
(58) Field of Classification Search
None
See application file for complete search history.

(56) References Cited

U.S. PATENT DOCUMENTS

| 6,676,344 | B1 * | 1/2004 | Amatt | G05B 19/4099 |
| | | | | 409/132 |
| 9,177,418 | B1 * | 11/2015 | Bawden | G06T 17/20 |
| 2002/0003539 | A1 * | 1/2002 | Abe | G06T 17/205 |
| | | | | 345/428 |
| 2002/0004713 | A1 * | 1/2002 | Wakabayashi | G06T 17/20 |
| | | | | 703/2 |
| 2014/0172151 | A1 | 6/2014 | Niwa et al. | |

FOREIGN PATENT DOCUMENTS

JP 5349712 B 8/2013

* cited by examiner

Primary Examiner — Ryan A Jarrett
(74) Attorney, Agent, or Firm — RatnerPrestia (57) ABSTRACT A numerical controller includes an optimum data amount calculation unit that calculates an optimum value of at least one of the number of vertices and the number of polygons of a workpiece after machining, where the number of vertices or the number of polygons are extracted from the CAD data, a three-dimensional data reduction unit that reduces the number of vertices or the number of polygons of the workpiece after machining extracted from the CAD data, a three-dimensional model generation unit that generates a three-dimensional model of the workpiece after machining based on the vertices or the polygons reduced, and a display unit that generates display data for displaying the three-dimensional model and display the generated display data on the display device.

8 Claims, 6 Drawing Sheets

NUMERICAL CONTROLLER

RELATED APPLICATION

The present application claims priority to Japanese Application Number 2018-168074 filed Sep. 7, 2018, the disclosure of which is hereby incorporated by reference herein in its entirety.

BACKGROUND OF THE INVENTION

1. Field of the Invention

The present invention relates to a numerical controller, and more particularly to a numerical controller that creates a three-dimensional model which is capable of performing an appropriate drawing process according to the display performance and the operation state of a display device.

2. Description of the Related Art

When a numerical controller controls a machine tool to machine a workpiece, a simulation of the machining situation is performed by a graphical display using a three-dimensional model. An operator can easily grasp the progress of machining by performing the simulation using this three-dimensional model, and in addition, the machining results can be checked in advance by performing the simulation before machining.

As a conventional technique for performing a simulation using a three-dimensional model in a numerical controller, for example, JP 5349712 B1 discloses an apparatus that displays a process shape figure obtained by executing a unit machining program including process shape information of a machining program in association with the machining program on a display unit by describing process shape information including tool information in the machining program, acquiring process shape data corresponding to tool information, creating the process shape figure (three-dimensional model) in which process shape data is changed based on parameters in process shape information, and displaying it on the display unit in accordance with the machining program. The technique disclosed in JP 5349712 B1, for example, can list a plurality of three-dimensional models in association with a plurality of machining programs, and can be used to change the display orientation of the three-dimensional model to validate the machining result from various viewpoints.

However, in the prior art disclosed in JP 5349712 B1, the three-dimensional model is generated based on process shape information obtained by analyzing the machining program, so that the three-dimensional model showing the shape of the workpiece is fine and the amount of data is large. For that reason, in the prior art numerical controller, there is a problem that the three-dimensional model created for display burdens the storage unit, three-dimensional model drawing process is overloaded, display processing is delayed when a plurality of three-dimensional models is displayed on the list screen, and the process is not performed smoothly when trying to change the display orientation of the three-dimensional model.

SUMMARY OF THE INVENTION

Therefore, an object of the present invention is to provide a numerical controller that creates a three-dimensional model which is capable of performing an appropriate drawing process according to the display performance and the operation state of a display device.

The numerical controller of the present invention solves the above problems by using CAD data (coordinate group data) for creating a three-dimensional model, and performing processing to reduce the number of vertices or the number of polygons in accordance with the display performance of the display device and the operation state of the numerical controller. Generally, when the display unit size of the display device is small, or resolution of the display device is low, it is not possible to grasp the fineness on the display screen even if a fine three-dimensional model is created by increasing the number of vertices and the number of polygons. Therefore, in the numerical controller of the present invention, a three-dimensional model in which the number of vertices or the number of polygons is appropriately reduced according to the display performance of the display device is created and used for display. As a result, while the load of display processing can be reduced, it is possible to display a three-dimensional model with sufficient accuracy for the operator to grasp the shape on the display device. Further, the data of the three-dimensional model reduced to the necessary and sufficient number of vertices or polygons does not occupy the capacity of the storage unit of the numerical controller more than necessary.

In one aspect of the present invention, a numerical controller displays, on a display device, a three-dimensional model of a workpiece after machining based on CAD data in association with a machining program generated based on the CAD data. The numerical controller includes an optimum data amount calculation unit that calculates an optimum quantity of at least one of the number of vertices or the number of polygons of a workpiece after machining, where the number of vertices or the number of polygons is extracted from the CAD data, a three-dimensional data reduction unit that reduces the number of vertices or the number of polygons of the workpiece after machining extracted from the CAD data based on the optimum quantity of the number of vertices or the number of polygons of the workpiece after machining calculated by the optimum data amount calculation unit, a three-dimensional model generation unit that generates a three-dimensional model of the workpiece after machining based on vertices or polygons reduced by the three-dimensional data reduction unit, and a display unit that generates display data for displaying the three-dimensional model generated by the three-dimensional model generation unit and display the generated display data on the display device.

According to the present invention, appropriate drawing processing can be performed according to the display performance of the display device and the operation state of the numerical controller.

BRIEF DESCRIPTION OF THE DRAWINGS

The above and other objects and features of the present invention will be apparent from the following description of embodiments with reference to the accompanying drawings. Of those figures.

DETAILED DESCRIPTION OF THE PREFERRED EMBODIMENTS

Hereinafter, embodiments of the present invention will be described with reference to the drawings.

Figure 1:
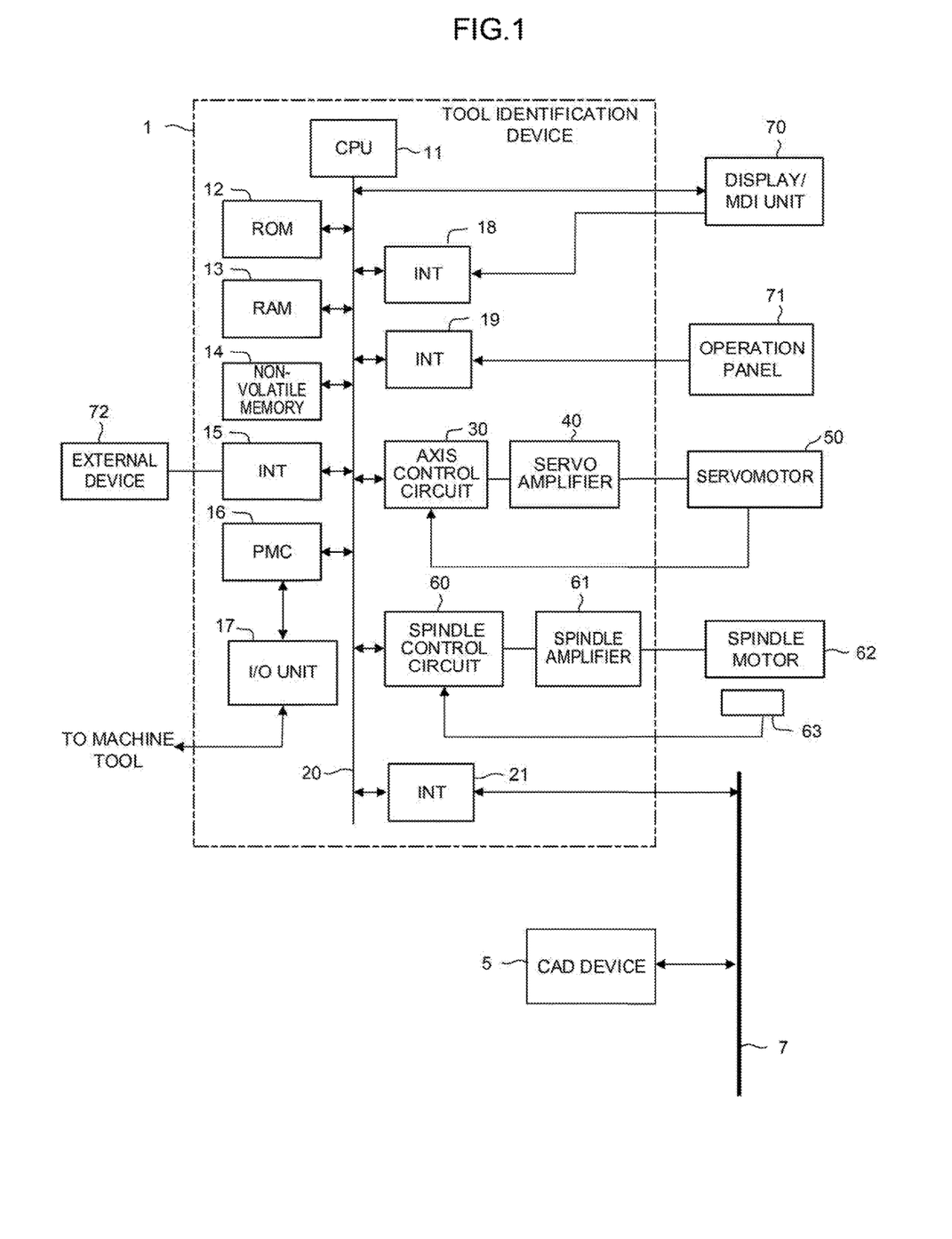
FIG. 1 is a schematic hardware configuration diagram of a numerical controller according to an embodiment.

FIG. 1 is a schematic hardware configuration diagram showing a main part of a numerical controller according to an embodiment of the present invention.

A CPU 11 included in a numerical controller 1 according to the present embodiment is a processor that controls the numerical controller 1 as a whole. The CPU 11 reads a system program stored in a ROM 12 via a bus 20, and controls the entire numerical controller 1 according to the system program. A RAM 13 temporarily stores temporary calculation data and display data, various data input from the outside, and the like.

A non-volatile memory 14 is configured by, for example, a memory or an SSD backed up by a battery (not shown), and the storage state is maintained even if the power of the numerical controller 1 is turned off. The non-volatile memory 14 stores control programs and CAD data read from an external device 72 via an interface 15, control programs acquired from another device via an interface 21, CAD data acquired from a CAD device 5, control programs input via a display/MDI unit 70, and various data acquired from each part of the numerical controller 1, a machine tool, a sensor, and the like. The control programs and various data stored in the non-volatile memory 14 may be expanded in the RAM 13 at the time of execution/use. In addition, various system programs such as a known analysis program are written in the ROM 12 in advance.

The interface 15 connects the numerical controller 1 with the external device 72 such as a USB device. The control programs, various parameters, and the like are read from the external device 72. Further, the control programs edited in the numerical controller 1, various parameters, and the like can be stored in the external storage unit via the external device 72. A programmable machine controller (PMC) 16 outputs a signal via an I/O unit 17 to the machine tool and peripheral devices of the machine tool (for example, a tool changer, an actuator such as a robot, a sensor attached to a machine tool, etc.) by a sequence program built in the numerical controller 1, and controls them. Also, the PMC 16, after receiving signals from various switches and peripheral devices of the operation panel disposed on the main body of the machine tool, performs the necessary signal processing, and transfers the signal to the CPU 11.

The display/MDI unit 70 is a manual data input device equipped with a display, a keyboard, etc. and an interface 18 receives a command and data from the keyboard of the display/MDI unit 70 and passes it to the CPU 11. Further, from the display/MDI unit 70, data relating to a display performance such as resolution and actual dimensions of the display screen can be acquired. An interface 19 is connected to an operation panel 71 provided with a manual pulse generator and the like used when manually driving each axis.

The interface 19 connects the numerical controller 1 with a wired/wireless network 7. The CAD device 5 that provides CAD data, other controllers that control machine tools installed in a factory, computers such as cell computers, edge computers, host computers, etc. are connected to the network 7, and information is exchanged mutually via the network 7.

An axis control circuit 30 for controlling an axis provided in the machine tool receives an axis movement command amount from the CPU 11 and outputs the axis command to a servo amplifier 40. In response to this command, the servo amplifier 40 drives a servomotor 50 that moves an axis provided in the machine tool. The servomotor 50 of the axis incorporates a position/speed detector, and feeds back the position/speed feedback signal from this position/speed detector to the axis control circuit 30 to perform position/speed feedback control. Although one axis control circuit 30, one servo amplifier 40 and one servomotor 50 are shown in the hardware configuration diagram of FIG. 1, in practice, they are prepared in accordance with the number of axes provided in the machine tool to be controlled.

A spindle control circuit 60 receives a spindle rotation command and outputs a spindle speed signal to a spindle amplifier 61. The spindle amplifier 61 receives the spindle speed signal, rotates a spindle motor 62 of the machine tool at a commanded rotational speed, and drives the tool. A position coder 63 is coupled to the spindle motor 62, the position coder 63 outputs a feedback pulse in synchronization with the rotation of the spindle, and the feedback pulse is read by the CPU 11.

Figure 2:
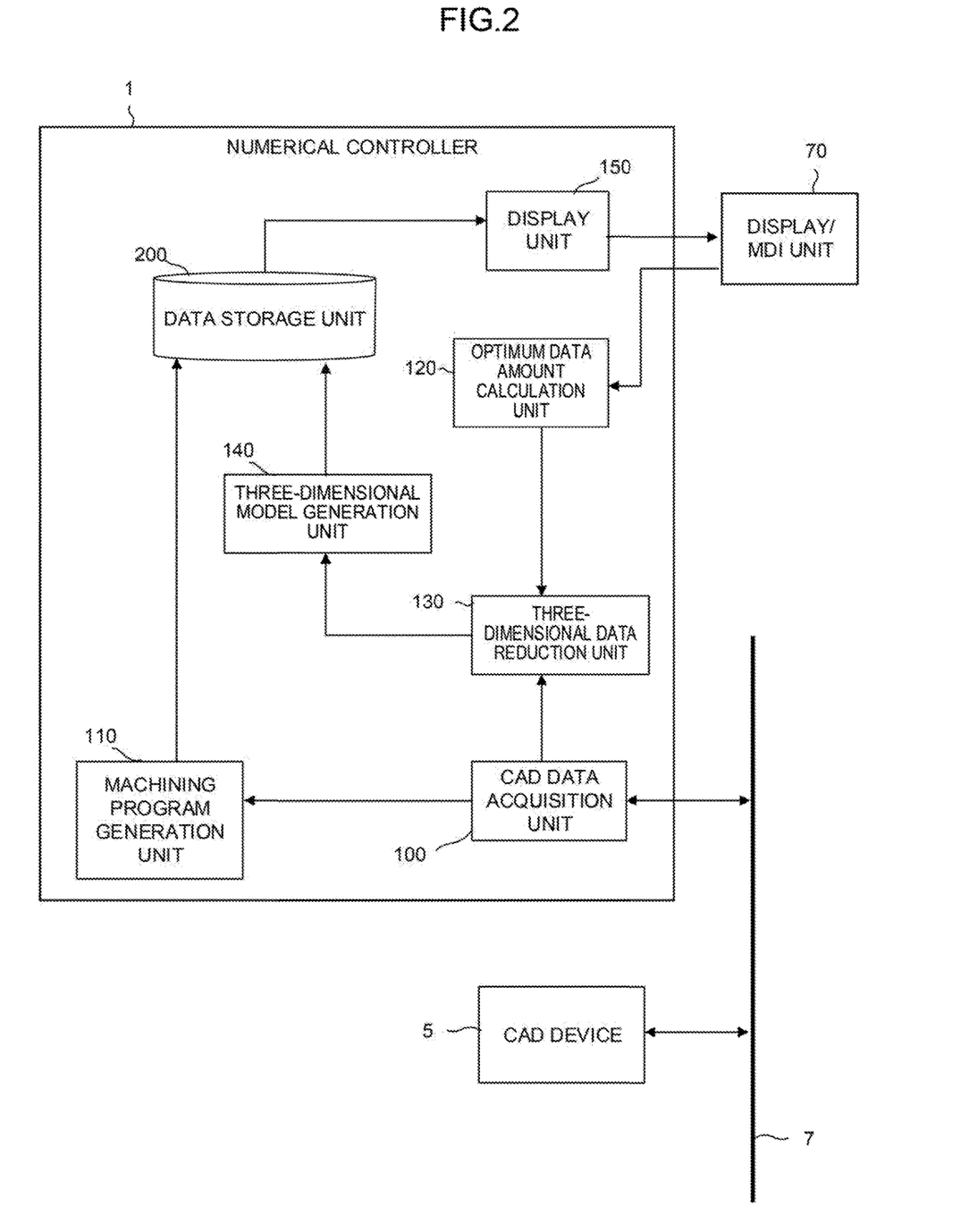
FIG. 2 is a schematic functional block diagram of a numerical controller according to a first embodiment.

FIG. 2 is a schematic functional block diagram of the numerical controller 1 according to the first embodiment of the present invention. Each functional block shown in FIG. 2 is implemented by the CPU 11 of the numerical controller 1 shown in FIG. 1 executing a system program and controlling the operation of each part of the numerical controller 1.

The numerical controller 1 of the present embodiment includes a CAD data acquisition unit 100, a machining program generation unit 110, an optimum data amount calculation unit 120, a three-dimensional data reduction unit 130, a three-dimensional model generation unit 140, and a display unit 150. In addition, a data storage unit 200 that stores the generated machining program and the three-dimensional model is secured on the non-volatile memory 14.

Figure 3:
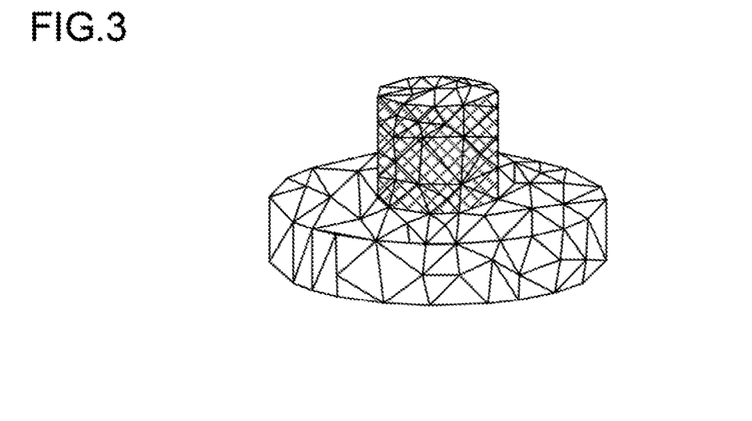
FIG. 3 is a view showing an example of vertices or polygons indicating the shape of a workpiece after machining included in CAD data.

The CAD data acquisition unit 100 is a functional unit that acquires CAD data created in the CAD device 5. The CAD data acquisition unit 100 may acquire CAD data from the CAD device 5 via the network 7 as shown in FIG. 2, or may acquire CAD data from the external device 72. The CAD data acquired by the CAD data acquisition unit 100 includes at least data in which relationships such as vertices, sides, faces, etc. indicating the shape of the workpiece after machining are geometrically defined. The shape of the workpiece after machining indicated by the CAD data can be expressed as, for example, a set of vertices or a set of polygons as illustrated in FIG. 3. Although FIG. 3 shows the workpiece after machining with a small number of vertices or polygons in order to make it easy to grasp the vertices and polygons indicating the shape of the workpiece, in practice, the shape of the workpiece after machining indicated by CAD data is represented by a greater number of vertices or polygons.

The machining program generation unit 110 is a functional unit that generates a machining program based on the CAD data acquired by the CAD data acquisition unit 100 and stores the generated machining program in the data storage unit 200. For example, the machining program generation unit 110 analyzes how the tool can be moved to create the shape of the workpiece after machining indicated by the set of vertices or the set of polygons based on a set of vertices or a set of polygons included in CAD data, and the information related to the tool used for processing, and generates a machining program, which is a series of machining program commands based on the movement path of the tool obtained as a result of analysis. The details of the process relating to the generation of the machining program are known as disclosed in, for example, WO 2014/184908 A and the like, and thus the description in the present specification is omitted.

The optimum data amount calculation unit 120 is a functional unit that calculates how much the data amount of the three-dimensional model is to be reduced from the CAD data acquired by the CAD data acquisition unit 100 based on the display performance of the display/MDI unit 70 and the operation state of the numerical controller. The optimum data amount calculation unit 120 calculates the optimum value of the number of vertices or the number of polygons when creating a three-dimensional model from CAD data according to the display performance (resolution, actual dimensions of display portion, etc.) of the display/MDI unit 70 as a display device. For example, the reference vertical dimension Lvs/the reference lateral dimension Lhs, the reference number of vertical pixels Rvs/the reference number of lateral pixels Rhs, and the reference number of vertices Vns or the reference number of polygons Pns of the optimal three-dimensional model for display on a display device serving as a reference are set on the setting region provided on the non-volatile memory 14 of the numerical controller 1 as a display size in a display device (for example, a display unit size: 15 inches, resolution: 1024× 768) as a reference in advance. The optimum data amount calculation unit 120 calculates the number of vertices Vnr or the number of polygons Pnr of the optimal three-dimensional model, for example, using Equations 1 or 2 shown below based on the reference numerical value set in the non-volatile memory 14, the actual vertical dimension Lvr/ the actual lateral dimension Lhr, and the actual number of vertical pixels Rvr/the actual number of lateral pixels Rhr obtained from the display/MDI unit 70.

$$Vnr = \frac{Lvr}{Lvs} \times \frac{Lhr}{Lhs} \times \frac{Rvr}{Rvs} \times \frac{Rhr}{Rhs} \times Vns \qquad \text{[Equation 1]}$$

$$Pnr = \frac{Lvr}{Lvs} \times \frac{Lhr}{Lhs} \times \frac{Rvr}{Rvs} \times \frac{Rhr}{Rhs} \times Pns \qquad \text{[Equation 2]}$$

In addition to the resolution and actual dimensions of the display/MDI unit 70, the optimum data amount calculation unit 120 may calculate, depending on the drawing ability of the graphic drawing engine provided by the display/MDI unit 70 or the numerical controller 1 as one of the display performance, an optimum value of the number of vertices or the number of polygons when creating a three-dimensional model from CAD data. In this case, the reference drawing ability Ges of the graphic drawing engine as a reference is further set in advance on the setting region provided on the non-volatile memory 14 of the numerical controller 1, and the optimum data amount calculation unit 120 may calculate, based on the actual drawing ability Ger of the graphic drawing engine in addition to the reference numerical value set in the non-volatile memory 14, and the actual display unit size and the actual pixel number of the display/MDI unit 70, the number of vertices Vnr or the number of polygons Pnr of an optimal three-dimensional model using, for example, the following Equations (3) and (4).

$$Vnr = \frac{Lvr}{Lvs} \times \frac{Lhr}{Lhs} \times \frac{Rvr}{Rvs} \times \frac{Rhr}{Rhs} \times \frac{Ger}{Ges} \times Vns \qquad \text{[Equation 3]}$$

$$Pnr = \frac{Lvr}{Lvs} \times \frac{Lhr}{Lhs} \times \frac{Rvr}{Rvs} \times \frac{Rhr}{Rhs} \times \frac{Ger}{Ges} \times Pns \qquad \text{[Equation 4]}$$

Furthermore, the optimum data amount calculation unit 120 may calculate the number of vertices Vnr or the number of polygons Pnr of the optimal three-dimensional model based on the display performance parameters relating to display by another display device.

For the reference number of vertices Vns or the reference number of polygons Pns, the number of vertices or the number of polygons of the three-dimensional model is, by experiment beforehand, determined, in the reference display device, as few as possible within the range where there is no problem in viewing the three-dimensional model by the operator, and the determined number of vertices or the determined number of polygons may be set as the reference number of vertices Vns or the reference number of polygons Pns. In general, the reference number of vertices Vns or the reference number of polygons Pns may be the number of vertices or the number of polygons based on which a three-dimensional shape that allows the operator to grasp a rough shape of the workpiece after machining can be drawn. On the other hand, the number of vertices or the number of polygons of the shape of the workpiece after machining included in the CAD data is extremely fine in order to improve the machining accuracy. Therefore, the reference number of vertices Vns or the reference number of polygons Pns is significantly smaller than the number of vertices or the number of polygons of the shape of the workpiece after machining included in the CAD data.

The three-dimensional data reduction unit 130 is a functional unit that calculates the reduced number of vertices Vnd or the reduced number of polygons Pnd, which is a value obtained by subtracting the number of vertices Vnr or the number of polygons Pnr calculated by the optimum data amount calculation unit 120 from the number of vertices or the number of polygons of the shape of the workpiece after machining extracted from the CAD data, respectively, to reduce vertices and polygons for the reduced number of vertices Vnd or the reduced number of polygons Pnd from the vertices or polygons of the shape of the workpiece after machining extracted from the CAD data acquired by the CAD data acquisition unit 100, respectively. The three-dimensional data reduction unit 130 reduces, using, for example, a known method such as an edge folding method or an optimal placement method, the number of vertices or the number of polygons of the shape of the workpiece after machining extracted from the CAD data to the number of vertices Vnr or the number of polygons Pnr of the optimal three-dimensional model for display on the display/MDI unit 70 calculated by the optimum data amount calculation unit 120.

Figure 4:
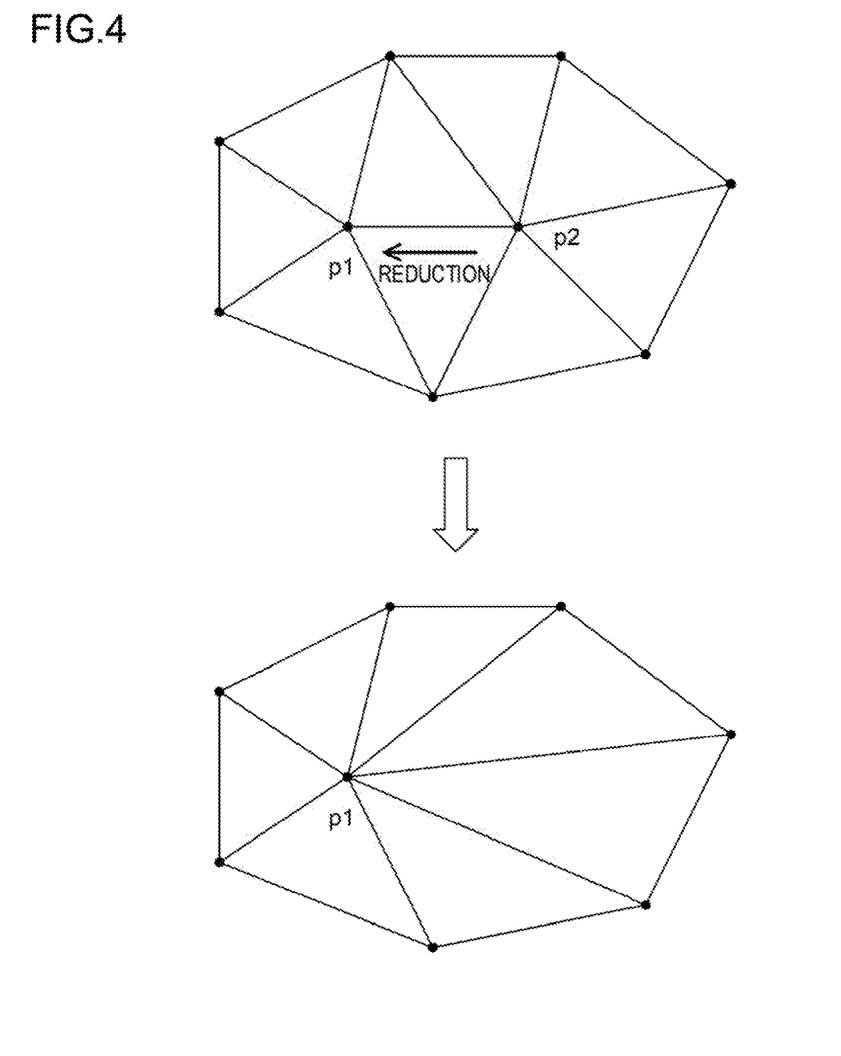
FIG. 4 is a diagram for explaining a method of reducing the number of vertices or the number of polygons.

FIG. 4 is a diagram showing an example of a reduction process of the number of vertices or the number of polygons by the three-dimensional data reduction unit 130. In the edge folding method and the optimal placement method, for example, after selecting two adjacent vertices p1 and p2, the selected two vertices p1 and p2 are combined into one vertex p1 to remove an edge (a line between the vertices or a side of a polygon shown in FIGS. 3 and 4), so that the number of vertices or the number of polygons are reduced. The three-dimensional data reduction unit 130 may select and reduce vertices or polygons as a whole for the reduced number of vertices Vnd or the reduced number of polygons Pnd from among vertices or polygons of the shape of the workpiece after machining extracted from the CAD data (For example, divide the workpiece shape of the CAD data by meshes for the reduction number, and reduce one vertex or one polygon in each mesh, etc.), or may select and reduce in order vertices or polygons whose surrounding vertices or polygons have a high density from among vertices or polygons of the shape of the workpiece after machining extracted from the CAD data. Although the three-dimensional data reduction unit 130 may reduce featured parts of the workpiece after machining (parts that feature the shape of the workpiece after machining, such as corners and sides of the workpiece after machining), practically, in the CAD data, the shape of the workpiece after machining is represented by a large number of vertices or polygons, so that even if some featured parts are reduced, the shape of the workpiece after overall machining can be sufficiently grasped when displayed on the display device, thereby not causing a big problem.

The three-dimensional model generation unit 140 uses the vertices or the polygons of the shape of the workpiece after machining after the vertices or polygons have been reduced by the three-dimensional data reduction unit 130 to generate a three-dimensional model that shows the shape of the workpiece after machining, and stores, in the data storage unit 200, the generated three-dimensional model in association with the machining program generated by the machining program generation unit 110.

Then, the display unit 150 displays the machining program and the three-dimensional model stored in the data storage unit 200 on the display/MDI unit 70.

In the numerical controller 1 of the present embodiment having the above configuration, the number of vertices or the number of polygons of the three-dimensional model of the workpiece after machining displayed on the screen is reduced, depending on the display performance of the display/MDI unit 70, in the range where the operator can sufficiently grasp the shape of the workpiece after machining by the display of the display/MDI unit 70, so that it is possible to reduce the load of display processing, and further, the data of the three-dimensional model reduced to the necessary and sufficient number of vertices or polygons does not occupy the capacity of the storage unit of the numerical controller 1 more than necessary.

Figure 5:
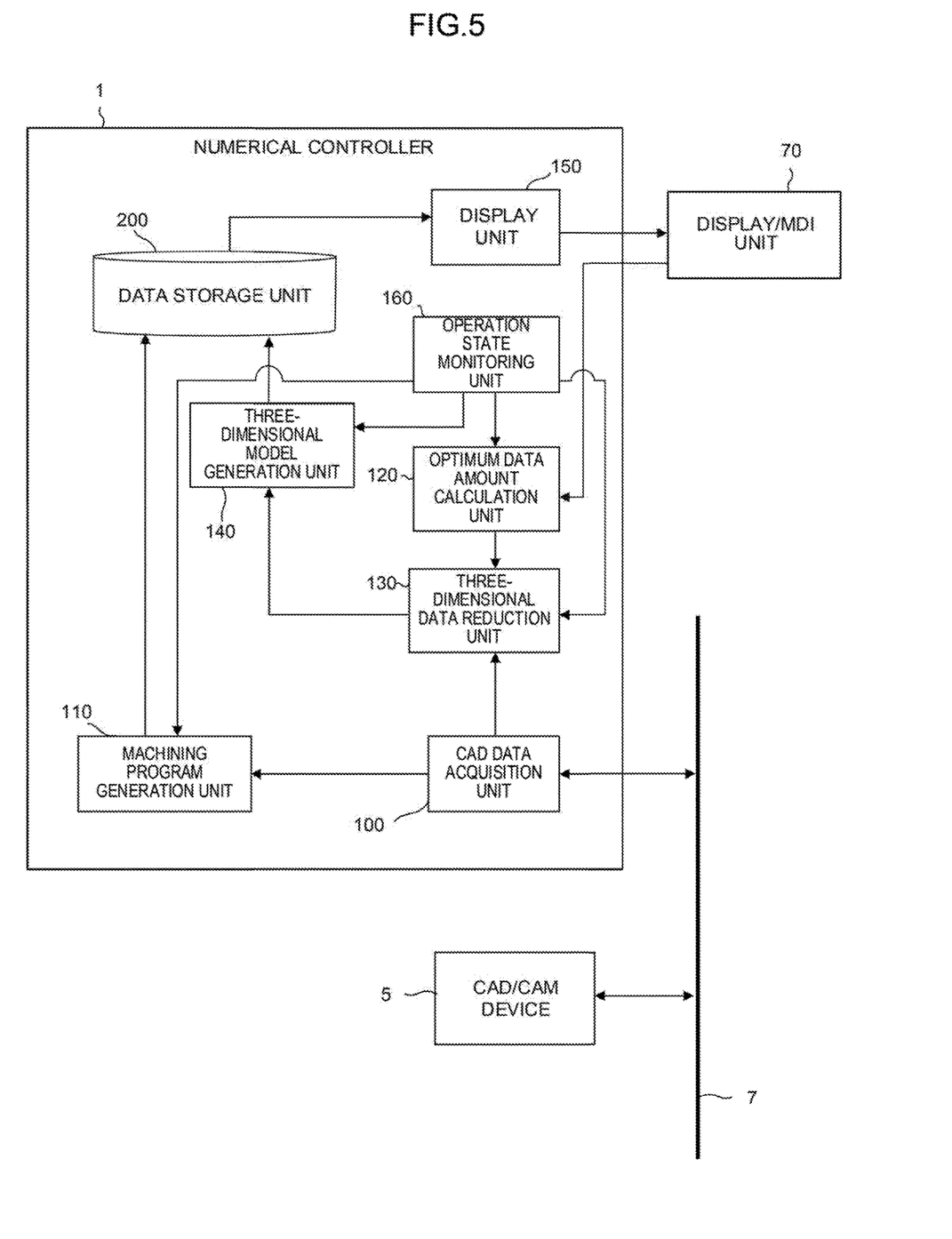
FIG. 5 is a schematic functional block diagram of a numerical controller according to a second embodiment.

FIG. 5 is a schematic functional block diagram of the numerical controller 1 according to a second embodiment of the present invention. Each functional block shown in FIG. 5 is implemented by the CPU 11 of the numerical controller 1 shown in FIG. 1 executing a system program and controlling the operation of each part of the numerical controller 1.

The numerical controller 1 of the present embodiment further includes an operation state monitoring unit 160 in addition to the functional units included in the numerical controller 1 of the first embodiment.

The operation state monitoring unit 160 is a functional unit that monitors the operation state of the entire numerical controller 1. The operation state monitoring unit 160 according to the present embodiment mainly monitors the load state of the CPU 11 of the numerical controller 1 as an operation state of the numerical controller 1, and when the CPU 11 is in a high load state equal to or higher than a predetermined first threshold value, instructs the machining program generation unit 110, the optimum data amount calculation unit 120, the three-dimensional data reduction unit 130, and the three-dimensional model generation unit 140 to suspend their processing. In addition, when the CPU 11 is in a low load state equal to or less than a predetermined second threshold value (<first threshold value) predetermined by the CPU 11, the operation state monitoring unit 160 instructs the machining program generation unit 110, the optimum data amount calculation unit 120, the three-dimensional data reduction unit 130, and the three-dimensional model generation unit 140 to resume their processing.

In the numerical controller 1 of the present embodiment having the above configuration, when the CPU 11 has a high load because the machining program is executed in the numerical controller 1 or the like, the processing performed by the machining program generation unit 110, the optimum data amount calculation unit 120, the three-dimensional data reduction unit 130, and the three-dimensional model generation unit 140 is temporarily suspended, so that the control processing related to the workpiece machining is not affected. In general, processing related to a three-dimensional model and processing for generating a machining program often consume a large amount of resources of the CPU 11, so that by providing such a configuration, these high load processing can be made not to adversely affect the control process which is the main process of the numerical controller 1.

Figure 6:
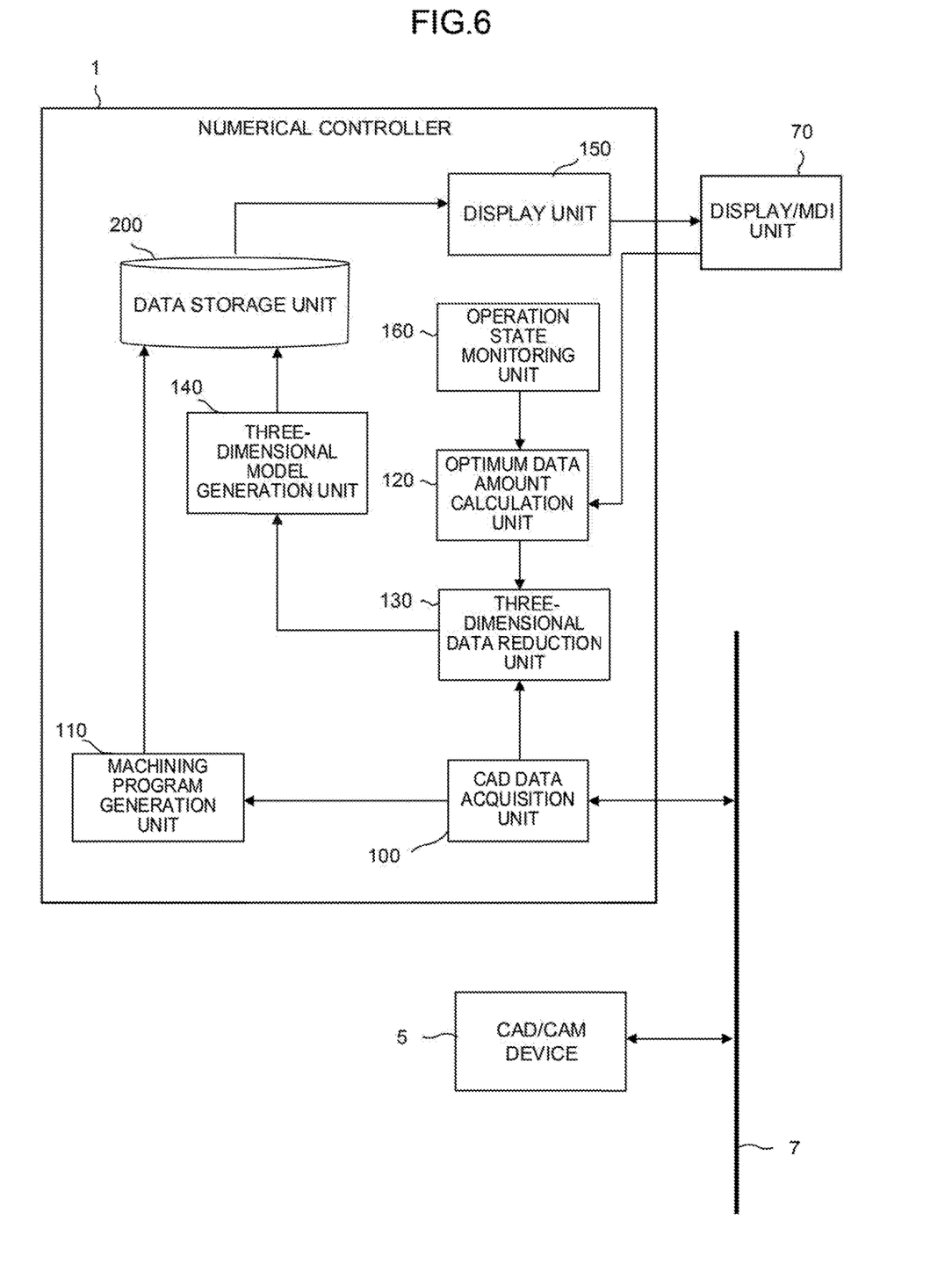
FIG. 6 is a schematic functional block diagram of a numerical controller according to a third embodiment.

FIG. 6 is a schematic functional block diagram of the numerical controller 1 according to a third embodiment of the present invention. Each functional block shown in FIG. 6 is implemented by the CPU 11 of the numerical controller 1 shown in FIG. 1 executing a system program and controlling the operation of each part of the numerical controller 1.

The numerical controller 1 of the present embodiment differs from those of the first and second embodiments in that the optimum data amount calculation unit 120 calculates the number of reduction in the number of vertices or the number of polygons of the three-dimensional model of the workpiece after machining based on the operation state of the numerical controller 1 monitored by the operation state monitoring unit 160 provided in the numerical controller 1 of the second embodiment.

The operation state monitoring unit 160 according to the present embodiment monitors, as an operation state of the numerical controller 1, the load state of the CPU 11 of the numerical controller 1, the operation mode of the numerical controller 1, the execution state of the machining program, the number of machining programs to be executed, and the like. The three-dimensional data reduction unit 130 calculates the reduction amount of the number of vertices or the number of polygons when creating a three-dimensional model from CAD data according to the operation state of the numerical controller 1 monitored by the operation state monitoring unit 160. For example, in the case where the CPU 11 is in less than a predetermined first threshold value predetermined in advance, the three-dimensional data reduction unit 130 calculates for example, the number of vertices Vnr or the number of polygons Pnr of the optimal three-dimensional model using the following Equations 5 or 6 based on coefficients such as the coefficient $\alpha_1$ previously defined in advance according to the operation mode of the numerical controller 1 (for example, 0.9 when the operation mode of the numerical controller 1 is the automatic operation mode, and 1 in any other case), the coefficient $\alpha_2$ defined in advance according to the execution state of the machining program by the numerical controller 1 (for example, 0.8 when executing a normal machining program, 0.6 when performing high-precision machining, and 1 in any other case), the coefficient $\alpha_3$ defined in advance according to the number of registered programs to be executed on the numerical controller 1 (for example, 0.9 when the number of registered programs is 1 to 3, 0.8 when 4 to 10, 0.6 when 11 or more, and 1 in any other case), and the like, the reference value set in the non-volatile memory 14, and the display performance of the display/MDI unit 70.

$$Vnr = \frac{Lvr}{Lvs} \times \frac{Lhr}{Lhs} \times \frac{Rvr}{Rvs} \times \frac{Rhr}{Rhs} \times Vns \times \alpha_1 \times \alpha_2 \times ... \quad [\text{Equation 5}]$$

$$Pnr = \frac{Lvr}{Lvs} \times \frac{Lhr}{Lhs} \times \frac{Rvr}{Rvs} \times \frac{Rhr}{Rhs} \times Pns \times \alpha_1 \times \alpha_2 \times ... \quad [\text{Equation 6}]$$

In the numerical controller 1 of the present embodiment having the above configuration, it is possible to reduce processing related to data reduction of three-dimensional model, the generation processing of the three-dimensional model, the display processing to the display device, etc. in the necessary and sufficient range depending on the operation state of the numerical controller 1, so that it is possible to prevent the control process that is the main process of the numerical controller 1 from being affected.

Figure 7:
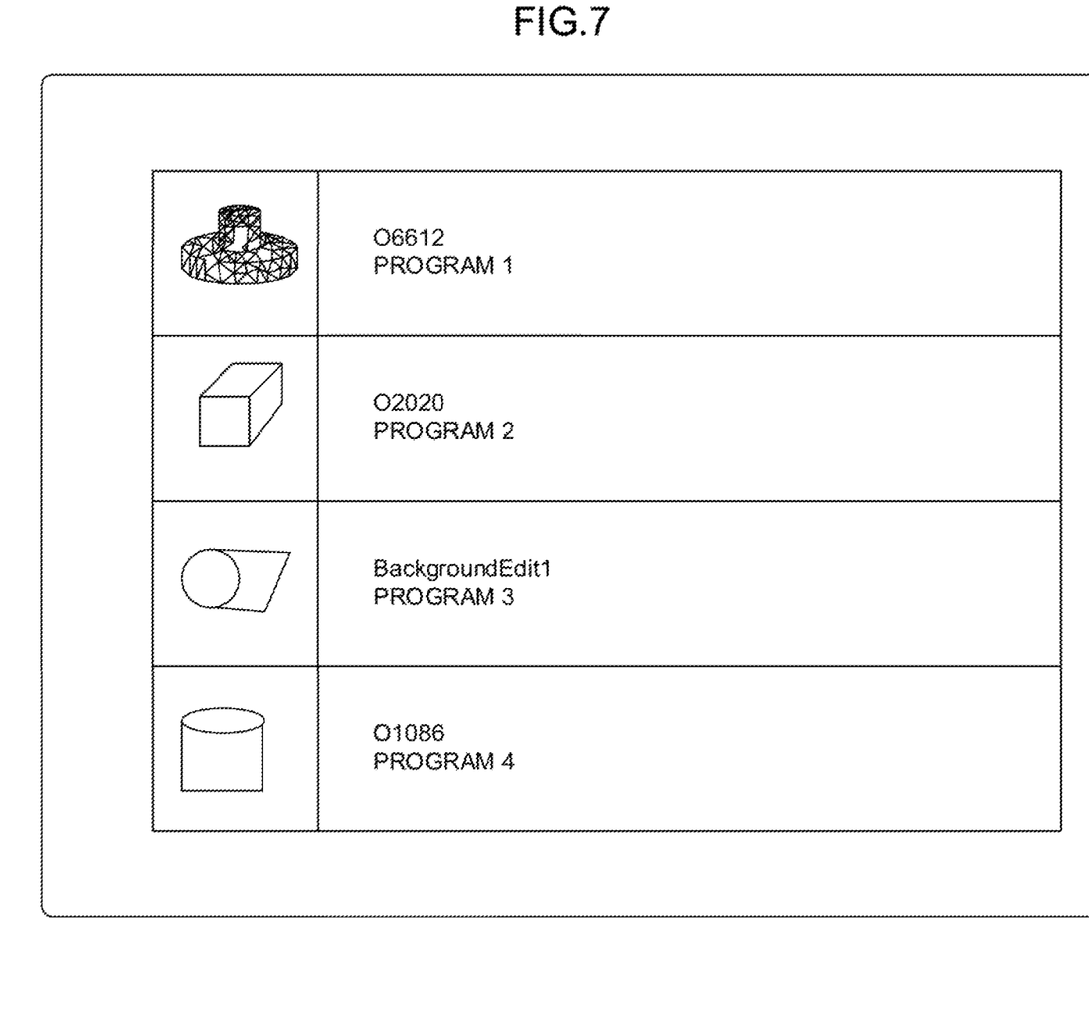
FIG. 7 is a diagram showing an example of a list of a machining program and a three-dimensional model.

As a modification of each of the above embodiments, the optimum data amount calculation unit 120 may calculate the number of vertices Vnr or the number of polygons Pnr of the optimal three-dimensional model according to the number of three-dimensional models displayed on the display/MDI unit 70. For example, as illustrated in FIG. 7, when displaying the shape of the workpiece after machining by each machining program together with a list of machining programs, etc., the optimum data amount calculation unit 120 may obtain the number of shapes of the workpiece after machining displayed on the screen from the operation state monitoring unit 160 to calculate the optimum number of vertices Vnr or the number of polygons Pnr in one three-dimensional model according to the number of shapes of the workpiece after machining displayed on the screen (for example, in the case where the four shapes of the workpiece after machining are displayed on the screen, the value calculated by the above-described Equations 1 to 6 is further divided by 4, etc.).

As another modification of each of the above embodiments, the optimum data amount calculation unit 120 may calculates the number of vertices Vnr or the number of polygons Pnr of the optimal three-dimensional model using the actual vertical and lateral dimensions and the actual number of vertical or lateral pixels of the display frame in the display unit where the shape of the workpiece after machining is displayed instead of the actual vertical dimension Lvr/the actual lateral dimension Lhr and the actual number of vertical pixels Rvr/the actual number of lateral pixels Rhr which are the display performance of the display/MDI unit 70.

As another modification of each of the above embodiments, the machining program generated by the machining program generation unit 110 and the three-dimensional model of the shape of the workpiece after machining generated by the three-dimensional model generation unit 140 may be managed by a storage unit of a host computer or the like (not shown) via the network 7, and may be shared with another numerical controller.

As mentioned above, although embodiments of this invention are described, this invention can be implemented in another aspect by adding an appropriate change without being limited to the examples of embodiments mentioned above.

The invention claimed is:

1. A numerical controller that displays, on a display device, a three-dimensional model of a workpiece after machining based on CAD data in association with a machining program generated based on the CAD data, the numerical controller comprising:
    an optimum data amount calculation unit that calculates an optimum value of at least one of the number of vertices and the number of polygons of a workpiece after machining, the number of vertices or the number of polygons being extracted from the CAD data;
    a three-dimensional data reduction unit that reduces the number of vertices or the number of polygons of the workpiece after machining extracted from the CAD data based on the optimum value of the number of vertices or the number of polygons of the workpiece after machining calculated by the optimum data amount calculation unit;
    a three-dimensional model generation unit that generates a three-dimensional model of the workpiece after machining based on the vertices or the polygons reduced by the three-dimensional data reduction unit; and
    a display unit that generates display data for displaying the three-dimensional model generated by the three-dimensional model generation unit and display the generated display data on the display device.

2. The numerical controller according to claim 1, wherein the optimum data amount calculation unit calculates an optimum value of at least one of the number of vertices and the number of polygons of a workpiece after machining extracted from the CAD data according to a display performance of the display device.

3. The numerical controller according to claim 2, wherein the display performance of the display device includes at least one of a size and the number of pixels of the display device.

4. The numerical controller according to claim 1, further comprising a machining program generation unit that generates a machining program based on the CAD data.

5. The numerical controller according to claim 4, wherein a machining program generated by the machining program generation unit and a three-dimensional model shape of the workpiece after machining generated by the three-dimensional model generation unit are stored in an external storage device via a network to share the machining program and the three-dimensional model shape stored in the external storage device with another numerical controller.

6. The numerical controller according to claim 1, further comprising
    an operation state monitoring unit that monitors an operation state of the numerical controller, wherein the operation state monitoring unit instructs the optimum data amount calculation unit, the three-dimensional data reduction unit, and the three-dimensional model generation unit to suspend operations thereof when a load state of a CPU of the numerical controller is equal to or greater than a predetermined first threshold value.

7. The numerical controller according to claim 6, wherein the optimum data amount calculation unit calculates an optimum value of at least one of the number of vertices and the number of polygons of the workpiece after machining extracted from the CAD data according to the operation state of the numerical controller monitored by the operation state monitoring unit.

8. The numerical controller according to claim 7, wherein the operation state of the numerical controller monitored by the operation state monitoring unit includes at least one of an operation mode of the numerical controller, an execution state of the machining program, the number of machining programs to be executed, and the number of three-dimensional models that are simultaneously displayed on the display device.

* * * * *